US012373257B2

(12) United States Patent
Bokam et al.

(10) Patent No.: US 12,373,257 B2
(45) Date of Patent: Jul. 29, 2025

(54) METHOD FOR STATIC SCHEDULING OF ARTIFICIAL NEURAL NETWORKS FOR A PROCESSOR

(71) Applicant: Deep Vision Inc., Los Altos, CA (US)

(72) Inventors: Lava Kumar Bokam, Hyderabad (IN); Sameek Bannerjee, Hyderabad (IN); Abhilash Bharath Ghanore, Hyderabad (IN); Rajashekar Reddy Ereddy, Hyderabad (IN); Wajahat Qadeer, Los Altos, CA (US); Rehan Hameed, Los Altos, CA (US); Mohamed Shahim, Hyderabad (IN); Sreenivas Aerra Reddy, Los Altos, CA (US)

(73) Assignee: Deep Vision Inc., Los Altos, CA (US)

( * ) Notice: Subject to any disclaimer, the term of this patent is extended or adjusted under 35 U.S.C. 154(b) by 1075 days.

(21) Appl. No.: 17/127,904

(22) Filed: Dec. 18, 2020

(65) Prior Publication Data
US 2021/0191765 A1 Jun. 24, 2021

Related U.S. Application Data

(60) Provisional application No. 62/949,905, filed on Dec. 18, 2019.

(51) Int. Cl.
*G06N 3/02* (2006.01)
*G06F 3/04842* (2022.01)
(Continued)

(52) U.S. Cl.
CPC ........ *G06F 9/5038* (2013.01); *G06F 3/04842* (2013.01); *G06F 9/4881* (2013.01);
(Continued)

(58) Field of Classification Search
CPC ...... G06F 9/5038; G06F 9/4881; G06F 30/20; G06F 18/29; G06F 18/2163; G06F 3/04842; G06F 2119/06; G06N 3/02
See application file for complete search history.

(56) References Cited

U.S. PATENT DOCUMENTS 7,930,198 B2 * 4/2011 Yin .................... G06Q 10/0631
705/7.12
10,474,497 B1 * 11/2019 Kancharla ............... G06F 9/546
(Continued)

FOREIGN PATENT DOCUMENTS

JP 4750350 B2 * 8/2011 ........... G06F 9/4881
WO WO-2020096639 A1 * 5/2020 ........... G06F 11/301

OTHER PUBLICATIONS

Mingyu Gao, etc., "TETRIS: Scalable and Efficient Neural Network Acceleration with 3D Memory", published in ASPLOS' 17, Apr. 8-Apr. 12, 2017, Xi'an, China, retrieved May 10, 2024. (Year: 2017).*

(Continued)

*Primary Examiner* — Shourjo Dasgupta
(74) *Attorney, Agent, or Firm* — Run8 Patent Group, LLC; Peter Miller; Brian T. Chew

(57) ABSTRACT

A method for scheduling an artificial neural network includes: accessing a processor representation of a multicore processor comprising processor cores, direct memory access cores, and a cost model; and accessing a network structure defining a set of layers. The method also includes, for each layer in the set of layers: generating a graph based on the processor representation, the graph defining compute nodes, data transfer nodes, and edges representing dependencies between the compute nodes and the data transfer nodes; and generating a schedule for the layer based on the graph, the schedule assigning the compute nodes to the processor cores and assigning the data transfer nodes to the direct memory (Continued)

access cores. The method further includes aggregating the schedule for each layer in the set of layers to generate a complete schedule for the artificial neural network.

16 Claims, 9 Drawing Sheets

(51) Int. Cl.
    *G06F 9/48*    (2006.01)
    *G06F 9/50*    (2006.01)
    *G06F 18/20*   (2023.01)
    *G06F 18/21*   (2023.01)
    *G06F 30/20*   (2020.01)
    *G06F 119/06*  (2020.01)

(52) U.S. Cl.
    CPC .......... *G06F 18/2163* (2023.01); *G06F 18/29* (2023.01); *G06F 30/20* (2020.01); *G06N 3/02* (2013.01); *G06F 2119/06* (2020.01)

(56) References Cited

U.S. PATENT DOCUMENTS

| | | | | |
|---|---|---|---|---|
| 10,956,132 | B1* | 3/2021 | Schneider | G06F 8/40 |
| 10,963,301 | B2* | 3/2021 | Vee | G06N 3/02 |
| 11,074,502 | B2* | 7/2021 | Baker | G06N 3/082 |
| 11,138,516 | B2* | 10/2021 | Harris | G06N 7/01 |
| 11,263,129 | B1* | 3/2022 | Ross | G06F 9/3009 |
| 11,372,577 | B2* | 6/2022 | Franca-Neto | G06N 3/063 |
| 11,461,579 | B2* | 10/2022 | Franca-Neto | G06V 10/82 |
| 11,468,338 | B2* | 10/2022 | Rossi | G06N 3/10 |
| 11,698,930 | B2* | 7/2023 | Gurwicz | G06F 16/9024 706/20 |
| 11,715,002 | B2* | 8/2023 | Phanishayee | G06N 3/048 706/25 |
| 12,020,168 | B2* | 6/2024 | Rossi | G06N 3/063 |
| 2011/0067030 | A1* | 3/2011 | Isard | G06F 8/433 718/102 |
| 2013/0332711 | A1* | 12/2013 | Leidel | G06F 9/3851 712/227 |
| 2014/0007043 | A1* | 1/2014 | Aliseychik | G06F 8/70 717/106 |
| 2015/0268992 | A1* | 9/2015 | Fan | G06F 9/4881 718/106 |
| 2015/0379429 | A1* | 12/2015 | Lee | G09B 5/00 706/11 |
| 2016/0232457 | A1* | 8/2016 | Gray | G06F 16/26 |
| 2016/0358101 | A1* | 12/2016 | Bowers | G06N 20/00 |
| 2017/0124452 | A1* | 5/2017 | Tucker | G06N 3/098 |
| 2017/0124454 | A1* | 5/2017 | Vasudevan | G06F 9/5066 |
| 2017/0132513 | A1* | 5/2017 | Yu | G06F 9/5038 |
| 2018/0285727 | A1* | 10/2018 | Baum | G06N 3/063 |
| 2018/0307973 | A1* | 10/2018 | Fang | G06N 3/063 |
| 2018/0307974 | A1* | 10/2018 | Fang | G06N 3/08 |
| 2018/0307976 | A1* | 10/2018 | Fang | G06N 3/08 |
| 2019/0114548 | A1* | 4/2019 | Wu | G06N 3/086 |
| 2019/0278808 | A1* | 9/2019 | Xia | G06F 16/27 |
| 2019/0286972 | A1* | 9/2019 | El Husseini | G06N 3/063 |
| 2019/0286973 | A1* | 9/2019 | Kovvuri | G06N 3/04 |
| 2019/0303197 | A1* | 10/2019 | Li | G06F 9/4887 |
| 2019/0311245 | A1* | 10/2019 | Zhang | G06F 17/16 |
| 2019/0317805 | A1* | 10/2019 | Metsch | G06N 20/00 |
| 2020/0019435 | A1* | 1/2020 | Stevenson | G06N 3/006 |
| 2020/0057675 | A1* | 2/2020 | Dias | G06N 3/086 |
| 2020/0104164 | A1* | 4/2020 | Pawlowski | G06F 9/3824 |
| 2020/0249998 | A1* | 8/2020 | Che | G06N 20/00 |

OTHER PUBLICATIONS

Shijie Li, etc., "A Novel Memory-Scheduling Strategy for Large Convolutional Neural Network on Memory-Limited Devices", published on Apr. 28, 2019 in Computational Intelligence and Neuroscience, vol. 2019, article ID 4328653, retrieved May 10, 2024. (Year: 2019).*

NVIDIA, "NVIDIA Tesla V100 GPU Architecture", published Aug. 15, 2018 to https://images.nvidia.com/content/volta-architecture/pdf/volta-architecture-whitepaper.pdf, retrieved May 10, 2024. (Year: 2018).*

Vaidehi Joshi, "Deep Dive Through a Graph: DFS Traversal", published Sep. 25, 2017 to https://medium.com/basecs/deep-dive-through-a-graph-dfs-traversal-8177df5d0f13, retrieved May 10, 2024. (Year: 2017).*

Mikhail Melnik, etc., "Workflow scheduling using Neural Networks and Reinforcement Learning", published in Procedia Computer Science 156, pp. 29-36, in 2019, retrieved May 10, 2024. (Year: 2019).*

Pawet Luniak, "CUDA Neural Network Implementation (Part 1)", published on Apr. 12, 2018 to https://luniak.io/cuda-neural-network-implementation-part-1, retrieved May 10, 2024. (Year: 2018).*

Arthur Stoutchinin etc., "Optimally Scheduling CNN Convolutions for Efficient Memory Access", published Feb. 4, 2019 to arXiv as 1902.01492v1, retrieved May 10, 2024. (Year: 2019).*

Daniel Justus, etc., "Predicting the Computational Cost of Deep Learning Models", published as of Nov. 28, 2018 to arXiv, retrieved Feb. 26, 2025. (Year: 2018).*

Tianqi Chen, etc., "TVM: An Automated End-to-End Optimizing Compiler for Deep Learning", published 13th USENIX Symposium on Operating Systems Design and Implementation, Oct. 8-10, 2018, Carlsbad, CA, USA, retrieved Feb. 26, 2025. (Year: 2018).*

Mu Li, "Introducing NNVM Compiler: A New Open End-to-End Compiler for AI Frameworks", published on Oct. 6, 2017 to https://aws.amazon.com/blogs/machine-learning/introducing-nnvm-compiler-a-new-open-end-to-end-compiler-for-ai-frameworks, retrieved Feb. 26, 2025. (Year: 2017).*

Samuel J. Kaufman, etc., "Learned TPU Cost Model for XLA Tensor Programs", presented via 33rd Conference on Neural Information Processing Systems (NeurIPS 2019), Vancouver, Canada, Dec. 8-14, 2019, retrieved Feb. 26, 2025. (Year: 2019).*

Eva Garcia-Martin, etc., "Estimation of energy consumption in machine learning", published in Journal of Parallel and Distributed Computing, vol. 134, pp. 75-88, 2019, made available online as of Aug. 21, 2019, retrieved Feb. 26, 2025. (Year: 2019).*

Yu Xing, etc., "An In-depth Comparison of Compilers for Deep Neural Networks on Hardware", published on Jun. 1, 2019 to 2019 IEEE International Conference on Embedded Software and Systems (ICESS), retrieved Feb. 26, 2025. (Year: 2019).*

* cited by examiner

METHOD FOR STATIC SCHEDULING OF ARTIFICIAL NEURAL NETWORKS FOR A PROCESSOR

CROSS-REFERENCE TO RELATED APPLICATIONS

This application claims the benefit of U.S. Provisional Application No. 62/949,905, filed on 18 Dec. 2019, which is incorporated in its entirety by this reference.

This application is related to U.S. patent application Ser. No. 16/026,480, filed on 3 Jul. 2018, U.S. Provisional Application No. 62/994,108, filed on 24 Mar. 2020, U.S. Provisional Application No. 63/030,183, filed on 26 May 2020, U.S. Provisional Application No. 63/071,874, filed on 28 Aug. 2020, all of which are incorporated in their entireties by this reference.

TECHNICAL FIELD

This invention relates generally to the field of static scheduling and more specifically to a new and useful method for static scheduling artificial neural networks in the field of edge evaluation of artificial neural networks.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
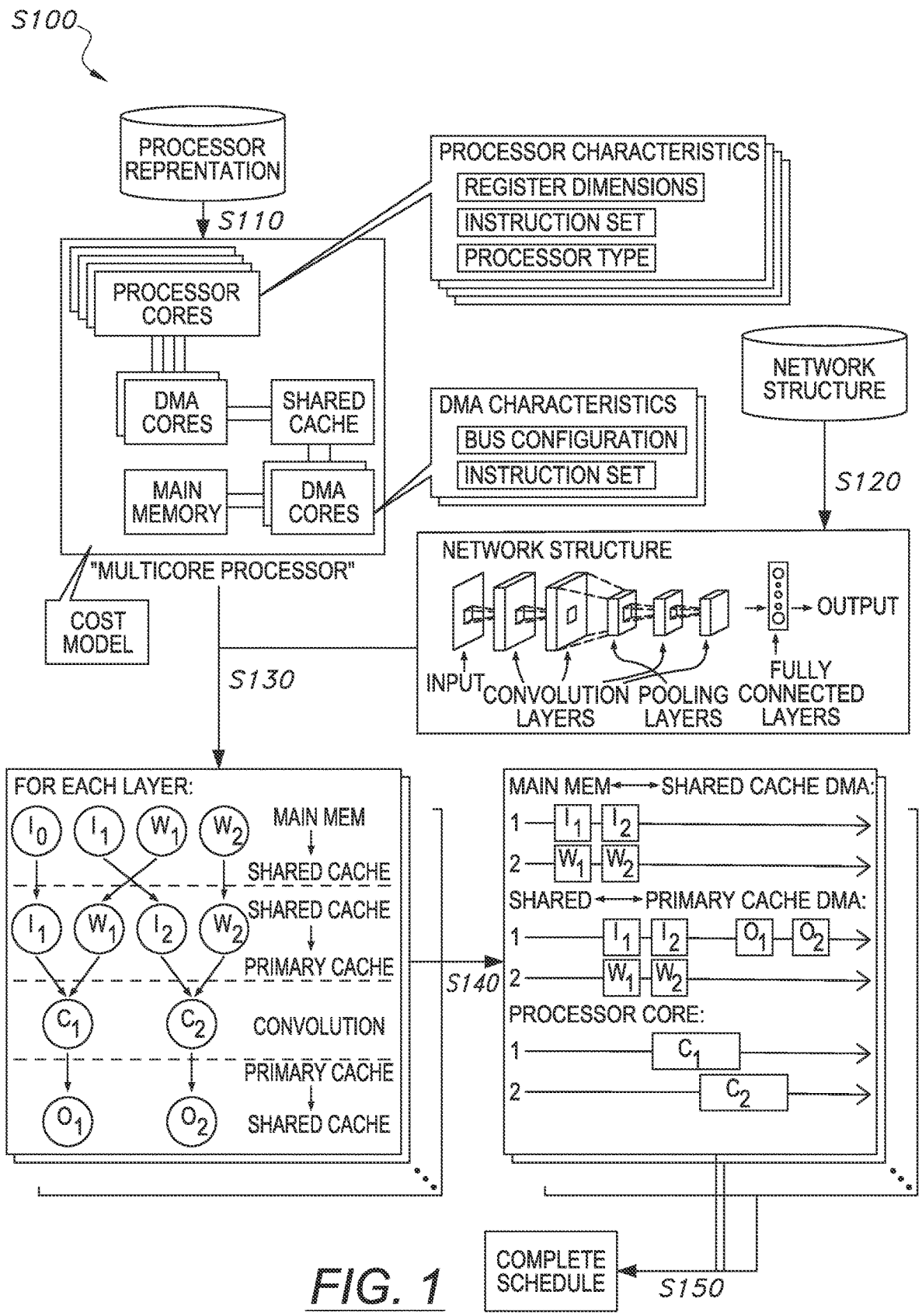
FIG. 1 is a flowchart representation of a method.

As shown in FIG. 1, a method S100 for scheduling an artificial neural network on a multicore processor includes: accessing a processor representation of the multicore processor including a set of processor cores characterized by a set of processor characteristics, a set of direct memory access cores characterized by a set of direct memory access characteristics, and a cost model in Block Silo; and accessing a network structure defining a set of layers of the artificial neural network in Block S120. The method S100 also includes, for each layer in the set of layers: generating a selected graph representing execution of the layer by the multicore processor based on the set of processor characteristics, the set of direct memory access characteristics, and the cost model, in Block S130, the selected graph defining a set of compute nodes representing a set of compute operations for the set of processor cores, a set of data transfer nodes representing a set of data transfer operations for the set of direct memory access cores, and a set of edges representing dependencies between the set of compute operations and the set of data transfer operations; and generating a selected schedule for the layer based on the selected graph, the selected schedule assigning the set of compute nodes to the set of processor cores and assigning the set of data transfer nodes to the set of direct memory access cores in Block S140. The method S100 additionally includes aggregating the selected schedule for each layer in the set of layers to generate a complete schedule for execution of the artificial neural network on the multicore processor in Block S150.

Figure 2:
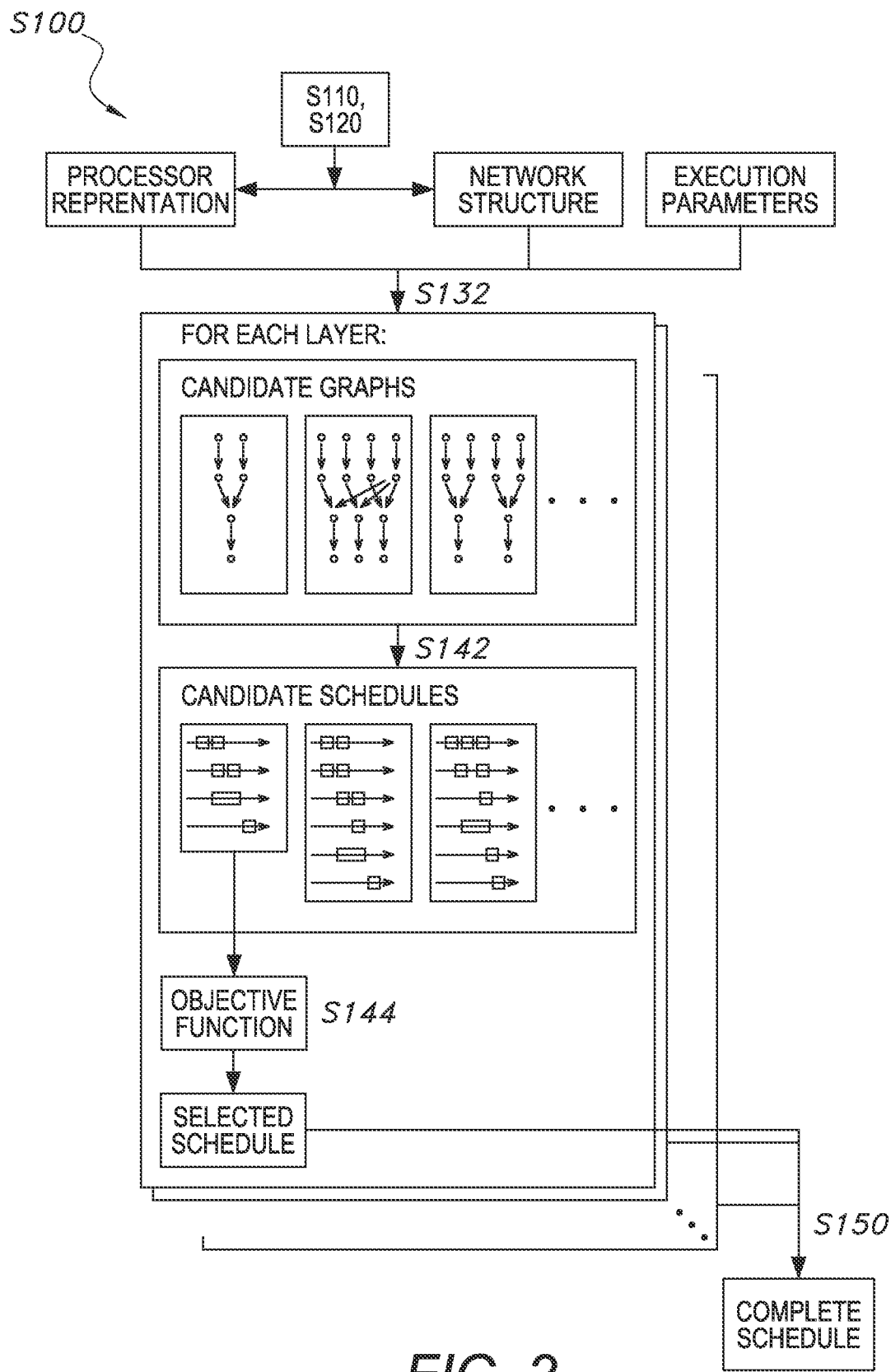
FIG. 2 is a flowchart representation of one variation of the method.

As shown in FIG. 2, one variation of the method S100 includes: accessing a processor representation of the multicore processor including a set of processor cores characterized by a set of processor characteristics, a set of direct memory access cores characterized by a set of direct memory access characteristics, and a cost model in Block S110; and accessing a network structure defining a set of layers of the artificial neural network in Block S120. This variation of the method S100 also includes, for each layer in the set of layers: generating a set of candidate graphs representing execution of the layer by the multicore processor based on the set of processor characteristics, the set of direct memory access characteristics, and the cost model, in Block S132, each candidate graph in the set of candidate graphs defining a set of compute nodes representing a set of compute operations, a set of data transfer nodes representing a set of data transfer operations, and a set of edges representing dependencies between the set of compute operations and the set of data transfer operations; generating a set of candidate schedules for the layer based on the set of candidate graphs, each candidate schedule in the set of candidate schedules assigning the set of compute nodes to the set of processor cores and assigning the set of data transfer nodes to the set of direct memory access cores in Block S142; and selecting a selected schedule for the layer from the set of candidate schedules for the layer based on an objective function in Block S144. This variation of the method S100 additionally includes aggregating the selected schedule for each layer in the set of layers to generate a complete schedule for execution of the artificial neural network on the multicore processor in Block S150.

Figure 3:
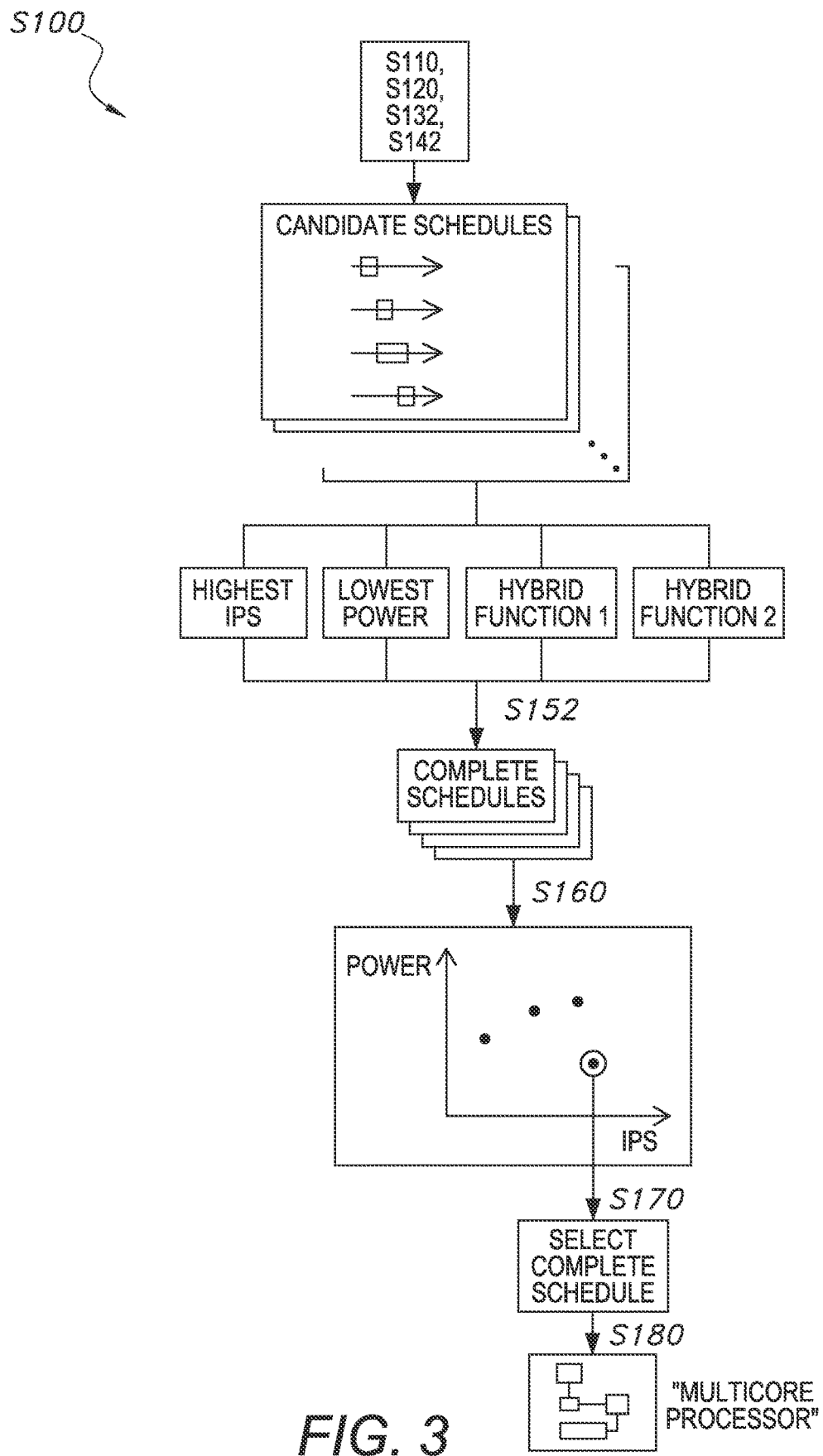
FIG. 3 is a flowchart representation of one variation of the method.

As shown in FIG. 3, one variation of the method S100 includes: accessing a processor representation of the multicore processor including a set of processor cores characterized by a set of processor characteristics, a set of direct memory access cores characterized by a set of direct memory access characteristics, and a cost model in Block S110; and accessing a network structure defining a set of layers of the artificial neural network in Block S120. This variation of the method S100 also includes, for each layer in the set of layers: generating a set of candidate graphs representing execution of the layer by the multicore processor based on the set of processor characteristics, the set of direct memory access characteristics, and the cost model, in Block S132, each candidate graph in the set of candidate graphs defining: a set of compute nodes representing a set of compute operations for the set of processor cores, a set of data transfer nodes representing a set of data transfer operations for the set of direct memory access cores, and a set of edges representing dependencies between the set of compute operations and the set of data transfer operations; and generating a set of candidate schedules for the layer based on the set of candidate graphs, each candidate schedule in the set of candidate schedules assigning the set of compute nodes to the set of processor cores and assigning the set of data transfer nodes to the set of direct memory access cores in Block S142. This variation of the method S100 additionally includes generating a set of complete schedules based on the set of candidate schedules for each layer in the set of layers in Block S152. This variation of the method S100 further includes, at a user interface: rendering a representation of the set of complete schedules in Block S160; and receiving a selection of a selected complete schedule in Block S170. This variation of the method S100 also includes loading the selected complete schedule onto the multicore processor in Block S180.

2. Applications

Figure 4:
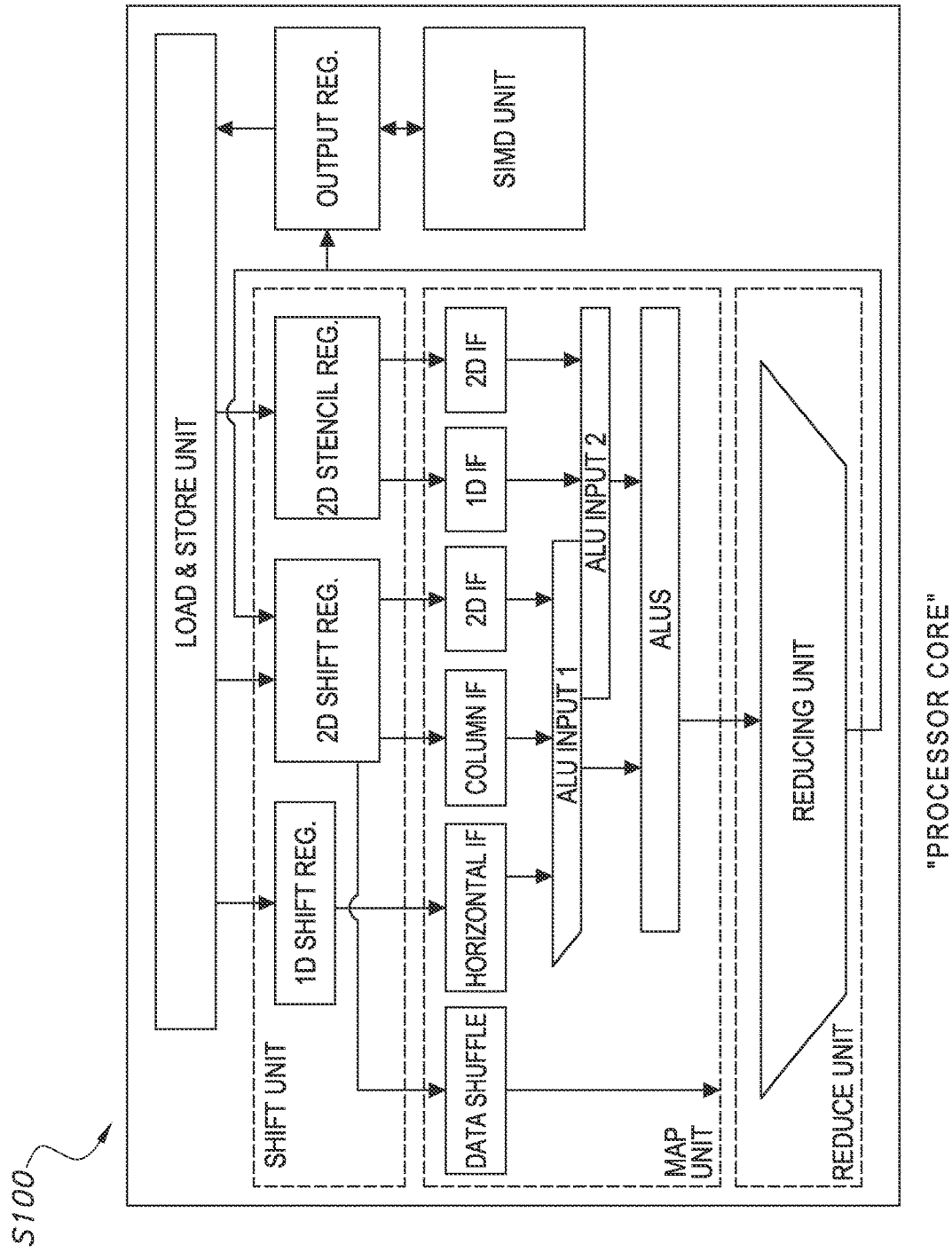
FIG. 4 is a schematic representation of a processor core.

Generally, as shown in FIG. 1, a computer system (hereinafter "the system"), which can include a single computational device or multiple computational devices (e.g., servers) connected over the internet, executes Blocks of the method S100 to generate a static schedule of an artificial neural network (hereinafter "the network") for execution on a multicore processor including both compute resources and data transfer resources. For example, the multicore processor can include: compute resources, such as central processing unit cores (hereinafter "CPU cores"), graphics process unit cores (hereinafter "GPU cores"), and/or network-specific processor cores (e.g., the deep vision processor as described in U.S. patent application Ser. No. 16/026,480 and shown in FIG. 4); and data-transfer resources, such as a set of direct memory access cores (hereinafter "DMA cores") configured to transfer data throughout the memory hierarchy of the multicore processor, as described in U.S. Provisional Application No. 63/030,183. In particular, the system can generate a static schedule that includes distinct command queues for both the set of compute resources of the multicore processor and the set of data-transfer resources of the multicore processor. By generating these distinct command queues, the system can generate a static schedule that increases performance and/or increases the power efficiency of a network executed on the multicore processor while maintaining complex trans-queue dependencies that characterize schedules for artificial neural networks. Thus, the system can cooperate with a multicore processor to increase the performance and/or power efficiency of artificial neural networks, such as convolutional neural networks (hereinafter "CNNs"), executed in edge-computing, low-power, and/or low-latency settings in which cloud computing is not practical.

More specifically, in order to generate a static schedule for a network on a multicore processor with heterogenous resources, the system can: access a processor representation defining the compute resources and data-transfer resources of the multicore processor; access a network structure defining the layers and connectivity of the network; generate a directed acyclic graph (hereinafter "DAG") representing individual operations for execution of the network on the multicore processor and dependencies between these operations for each layer of the network; generate a fixed schedule for each layer of the network assigning these operations to specific compute resources and data-transfer resources of the multicore processor; and aggregating these per-layer schedules into a complete schedule for the network executed on the multicore processor.

The system generates a static schedule for a network based on the particular hardware components and layout of the multicore processor. Therefore, the system can access processor characteristics via the processor representation, such as the register dimensions (e.g., register file dimensions) of each compute resource of the multicore processor, arithmetic logic unit configuration (hereinafter "ALU") and reduction unit configuration, and/or the instruction set of each compute resource of the multicore processor. The system can also access DMA characteristics via the processor representation, such as the transfer bus width and configuration of each DMA core, the instruction set of each DMA core (e.g., strided transfer, broadcast functionality), and/or the memory hierarchy of the multicore processor.

Additionally, the system can access the network structure that defines properties of the network such as the number of layers, the type of each layer (e.g., convolutional, fully connected, pooling), dimensions of the input tensor for each layer (hereinafter "input tensor dimensions"), weight tensor dimensions of each layer. The system can further access or derive, based on the input tensor dimensions of a subsequent layer, the dimensions of the output tensors (hereinafter "output tensor dimensions"). Thus, the system can generate a layer-specific schedule defining compute operations and data-transfer operations that execute a particular layer on the multicore processor based on the properties of the layer accessed from the network structure.

Upon accessing the properties of the processor and the structure of the network to be executed on this processor, the system can: generate partitions of the input tensor for each layer of the network (hereinafter "input partitions"); and generate partitions of the weights of each layer of the network (hereinafter "weight partitions"). The system generates these partitions based on register dimensions, the register-to-ALU architecture dimensions of the processor, the input dimensions and weight dimensions for each layer of the network, the transfer speed of each transfer bus, and the routing of these transfer buses between memory locations and registers of the processor. Thus, the system can divide input tensors and weights into smaller partitions that can be efficiently transferred between memory locations and processed based on the properties of the processor. Additionally, by generating these partitions, the system can create a mapping of each layer computation which can be processed in parallel by various computational resources of the processor and subsequently reduced to calculate the appropriate output tensor of the layer, thereby improving processing time for each layer of the network.

Upon generating the partitions of the input tensors and weights of each layer, the system can define a set of operations to execute each layer computation from input partitions and the weight partitions based on a cost model for each operation type of the processor. These operations can include shifting tensor data between storage locations via transfer busses, shifting data via shift registers, performing stencil operations on stored data, performing ALU operations on input partitions and weight partitions; and reducing ALU outputs to form layer outputs at the reducing unit. In response to varying priorities of a user of the system, the system can access different cost models prioritizing power usage, inference time, or memory utilization.

After generating the set of operations, the system can organize the set of operations corresponding to each layer of the network into a DAG defining dependencies between each operation in the set of operations. The system can generate these operations based on the type of each layer. For example, in a convolutional layer, the system can generate a set of operations corresponding to a parallelized convolution operation on the input tensor utilizing the weights of the layer. Subsequently, the system can utilize scheduling algorithms—such as DAG scheduling algorithms—to allocate each operation in the DAG to a transfer bus or a computational resource of the processor. Therefore, the system can generate a fixed schedule for execution of a network on a processor automatically in order to facilitate a power- and time-efficient parallelized process for executing the network (e.g., according to MapReduce computational principles).

Once the schedule for the processor is complete, the system can also simulate the execution of this schedule on the processor to calculate IPS of the network executed on the multicore processor, the power consumption of the processor executing the network, and/or the memory utilization of the processor during execution of the network. Thus, the system can present critical design information to a user of the system regarding the efficacy of the schedule for the user's application prior to physical testing of the processor executing the network.

As shown in FIG. 1, the system is described herein as executing Blocks of the method S100 to generate a fixed schedule for executing a network on a network-specific processing chip. However, the system can also generate a fixed schedule for a CPU, GPU, or other processing chip.

3. Processor Representation

Generally, the system can generate a static schedule for a deep vision processor described in U.S. patent application Ser. No. 16/026,480. In order to generate a static schedule for a processor, the system can access properties of the multicore processor in Block S110. More specifically, the system can access a processor representation of the multicore processor including a set of processor cores characterized by a set of processor characteristics, a set of direct memory access cores characterized by a set of direct memory access characteristics, and a cost model in Block S110. Thus, the system can identify the set of compute resources of the multicore processor, the set of data-transfer resources of the multicore processor, and the memory hierarchy of the multicore processor and the layout of these components within the multicore processor.

3.1 Memory Hierarchy

Generally, the system can access a processor representation that defines the memory hierarchy of the multicore processor. The memory hierarchy of the multicore processor can include a main memory (i.e., DDR SDRAM), a shared cache (i.e., L2 memory), and a set of primary caches for each processor core of the multicore processor. Thus, by accessing the memory hierarchy of the multicore processor, the system can generate a schedule that defines a valid data-path for input tensors, weight tensors, and output tensors within the multicore processor.

In one implementation, the system can access a processor representation that defines the dimensions of each memory component in the multicore processor in order to generate a static schedule that specifies memory addresses for transfer operations assigned to the data-transfer resources of the processor. For example, the system can access a processor representation that defines a number of memory banks within the shared cache and the dimensions of the primary cache for each processor in order to partition the input tensors, weight tensors, and output tensors of the network such that these partitions can fit within each memory component along their data path during execution of the network on the multicore processor.

3.2 Data-Transfer Resources

Generally, the system can access a processor representation that defines the set of data-transfer resources of the multicore processor. More specifically, the system can access a representation of a set of DMA cores of the multicore processor configured to transfer data between memory locations in the memory hierarchy of the processor. For example, the system can access a processor representation defining eight DMA cores: four main-memory-to-shared-cache DMA cores configured to transfer data between the main memory of the multicore processor and the shared cache of the multicore processor; and four shared-to-primary cache DMA cores configured to transfer data between the shared cache of the multicore processor and the primary cache of each processor core of the multicore processor. Thus, the system can access the processor representation in order to identify the functionality of each data-transfer resource relative to the memory hierarchy of the multicore processor.

In one implementation, the system can access a processor representation including a set of DMA cores as described in U.S. Provisional Application No. 63/030,183. In this implementation, the system can access a processor representation that defines a specialized instruction set that includes strided transfer operations, data transpose operations, padding operations, and broadcast functionality, as is further described in U.S. Provisional Application No. 63/071,874.

In another implementation, the system can access a processor representation that defines a transfer bus configuration of each DMA core in the set of DMA cores. For example, the system can access a processor representation that indicates that each DMA core in a subset of DMA cores is configured to transfer data into or out of a specific subset of primary caches. Thus, the system can identify primary memory locations addressable via each DMA core represented in the processor representation.

3.2.1 Transfer Busses

In one implementation, the system can also access the size and bandwidth of the transfer busses between primary caches, the shared cache, and/or the main memory of the processor. For example, the system can access a processor representation indicating that the processor includes 16-bit, 32-bit, 64-bit, 128-bit, etc. parallel busses between various points in the memory hierarchy. Therefore, the system can partition the input tensor and/or the weight of each layer of the network based on the size of the transfer busses between the primary caches, shared cache, and/or main memory of the processor. Additionally or alternatively, the system can generate input partitions and weight partitions independent of the transfer busses of the processor.

3.3 Compute Resources

The system can also access a processor representation indicating the compute resources of the processor and the instruction set of each compute resource. More specifically, the system can access a processor representation including a set of processor cores characterized by the set of processor characteristics including: register types of each processor core in the set of processor cores; register dimensions of each processor core in the set of processor cores; and core type of each processor core in the set of processor cores. Thus, the system can distinguish between the types of processor cores within the multicore processor and identify the particular functions supported by each processor core in order to generate a static schedule for the network that efficiently utilizes the functionality of each processor core of the multicore processor.

The system can access a processor representation that defines a set of heterogeneous or homogeneous compute resources. For example, the processor can include multiple cores of the same type (e.g., capable of executing multiple types of instructions) or multiple cores of different types (e.g., each designed to perform specific network related instructions). In one implementation, the processor can include a convolution core (e.g., optimized for performing convolution operations for convolutional layers), a pooling core (e.g., optimized for executing pooling layers), and/or a fully-connected core (e.g., optimized for executing fully connected layers). In another implementation, the processor can also include multiple ALU and/or reducing units (hereinafter "RUs") within each core, which can independently operate on the data. For example, the processor can execute operations acting on the input partitions and the weight partitions according to a MapReduce technique for parallel processing executed across processor cores of the multicore processor.

Therefore, the system can access a list of each computational resource of the processor and/or the instructions that are executable on each of these resources.

3.3.1 Register Dimensions

In one implementation, the system can access register dimensions of the processor in order to calculate valid partition sizes for the input tensors, weight tensors, and output tensors of each layer of the network. In this implementation, the system can access a processor representation defining a 2D register file (e.g., as a set of banked vector registers or in a group-based shift register architecture) in order to more efficiently accommodate multidimensional image and/or tensor data. For example, the processor can include 32 1-row 1D vector registers, 16 2-row 2D vector registers (e.g., 16 groups of two registers), or 8 4-row, 2D vector registers (e.g., 8 groups of four registers).

The system can access a processor representation defining multiple register files for different types of network-related data. For example, the system can access a processor representation that defines an input tensor register for storing input partitions and a weight register for storing weight partitions. In one implementation, the processor can include 3×3 weight registers for computing 3×3 convolution filters.

The processor can include 1D shift registers, 2D shift registers, and 2D stencil registers, which can simultaneously (e.g., in parallel) access multiple shifted windows of data from the input tensor register for single-input-multiple-data (hereinafter "SIMD") instructions.

Therefore, the system can access data indicating the particular register configuration of the processor, such as the dimensions of an input tensor register and a weight tensor register. In one implementation, the system accesses a maximum dimension of the register of the processor in order to inform the partitioning step of the system.

3.4 Cost Model

Generally, the system accesses a cost model for the multicore processor that defines the time (in number of cycles) and the energy consumed by each function of the set of compute resources of the multicore processor in order to minimize the cost of these operations while generating the static schedule. More specifically, the system can access the processor representation of the multicore processor including a cost model indicating a number of cycles and a power consumption of each operation in the set of compute operations and each operation in the set of data-transfer operations. The system can access a cost model that defines values based on empirically- and/or theoretically-derived data from an instance of the multicore processor, thereby ensuring the accuracy of the cost model.

In one implementation, the system can access a cost model for the multicore processor that, in addition to defining the active costs of each operation of the multicore processor, also defines the passive costs incurred by the multicore processor during execution of the network. For example, the system can access a cost model defining a passive power consumption of each memory component of the multicore processor based on the state of each memory component. In this example, the system can estimate the passive power consumption of a shared cache based on the proportion of occupied memory banks in the shared cache. In another example, the system can access a cost model that defines passive costs related to dynamically scheduled operations (e.g., command queueing, counter operation, reorder buffer operation, collision avoidance systems) of the multicore processor that are a function of the state of the processor, as opposed to the particular operations executed by the processor.

In another implementation, the system can access a cost model that defines a cost metric that is a function of the approximate number of cycles and power consumption estimated by the cost model. For example, the system can access a cost model that defines a cost metric for an operation based on a weighted combination of the approximate number of cycles and the approximate power consumption of an operation executed by the multicore processor. Additionally, the system can receive input from a user of the system that defines the cost metric of the cost model based on design priorities for the static schedule being generated for the network structure. For example, the system can receive input from a user indicating that the user wishes to keep the peak power consumption of the processor below a threshold power consumption. In an alternative example, the system can receive input from a user indicating that the user wishes to minimize the processing time of the network when executed on the processor.

4. Network Structure

Generally, the system can access a network structure defining a set of layers of the artificial neural network, in Block S120. More specifically, the system can access a network structure defining a set of layers of the artificial neural network, each layer in the set of layers characterized by: a layer type; a set of input tensor dimensions; and a set of weight tensor dimensions. For example, the system can access a network defined via a deep-learning framework (e.g., CAFFE, TENSORFLOW, or TORCH) to identify each layer of the network; the layout of each layer relative to each other; the type of each layer; and the input and weight tensor dimensions of each layer.

In one implementation, the system can access a network structure defining a set of layers, each layer characterized by a layer type in a set of layer types. Thus, the system can access network structures that indicate a distinct category for each layer in the network. For example, while generating a static schedule for a CNN, the system can access a network structure that characterizes the layer type as one of a set of layer types including: an input layer type, an output layer type, a convolutional layer type, a pooling layer type, and a fully connected layer type. Thus, by referencing the network structure, the system can generate candidate graphs representing execution of each layer by the multicore processor.

In another implementation, the network structure can define activation functions utilized at each layer of the network as well as batch normalization and scaling layers within the network. Furthermore, the network structure can define the pooling algorithm corresponding to a pooling layer or the window dimensions for a convolutional layer.

Thus, the system can access a full representation of the network structure sufficient to execute the network on the multicore processor.

5. Graph Generation

Generally, the system can, for each layer in the set of layers of the network, generate a graph (i.e., a DAG) representing execution of the layer on the multicore processor in Block S130. More specifically, the system can generate a graph for a layer that defines: a set of compute nodes representing a set of compute operations for the set of processor cores, a set of data transfer nodes representing a set of data transfer operations for the set of direct memory access cores, and a set of edges representing dependencies between the set of compute operations and the set of data transfer operations.

In one implementation, the system can calculate a cost for each node in the graph. For example, the system can calculate a time value to each node in the graph based on the operation represented by the node, the cost model, and the set of processor characteristics or the set of DMA characteristics. Additionally or alternatively, the system can calculate an energy consumption of each node in the graph based on the operation represented by the node, the cost model, and the set of processor characteristics or the set of DMA characteristics. In another alternative, the system can calculate the power consumption of each node in the graph based on the operation represented by the node, the cost model, and the set of processor characteristics.

The system can generate a graph representing execution of a layer by the multicore processor by accessing execution parameters from both the processor representation and the network structure including: the set of processor characteristics, the set of direct memory access characteristics, the cost model, the layer type of the layer, the set of input tensor dimensions of the layer, and the set of weight tensor dimensions of the layer. Additionally, because thousands of valid combinations of the aforementioned execution parameters exist for each layer of the network, the system can execute a search space reduction algorithm to narrow the number of options and select a selected graph for the layer from a set of candidate graphs, each candidate graph resulting from a different combination of execution parameters.

In one implementation further described below, the system can: partition the input tensor of a layer and the weight tensor of a layer to generate a set of input partitions and a set of weight partitions; and generate a graph representing compute and data transfer operations for transforming these input partitions and weight partitions into output partitions according to calculations defined by the layer type. Thus, in this implementation, the system generates a graph for a layer including data transfer operations and compute operations that successively: transfer input partitions and weight partitions from the main memory of the processor to the shared cache of the processor; distribute these input partitions and weight partitions among the set of primary caches of the set of processor cores; compute, at each processor core, output partitions based on the input partitions, the weight partitions, and the layer type of the layer; and transfer the output partitions from the primary cache of each processor core to the shared cache or the main memory.

In another implementation, the system can generate a graph defining an initial set of operations that have not been optimized for efficiency. For example, the system can define an initial set of operations that include a greater number of data transfers between memory locations than necessary. The system can later remove redundant data transfers into and out of the register files of the processor.

5.1 Per-Layer Barrier Mechanism

In one implementation, by generating independent graphs for each layer of the network, the system, in effect, generates complete schedules that include a per-layer barrier mechanism, thereby simplifying execution of the network and preventing collisions during transitions between execution of adjacent layers by the multicore processor. Thus, a multicore processor executing a static schedule generated by the system completes all operations associated with a first layer prior to initiating operations associated with a subsequent layer. Therefore, in one implementation, the system can store the output of a particular layer at a memory location that corresponds to the expected memory location for the input of a subsequent layer.

5.2 Partitioning

Figure 5:
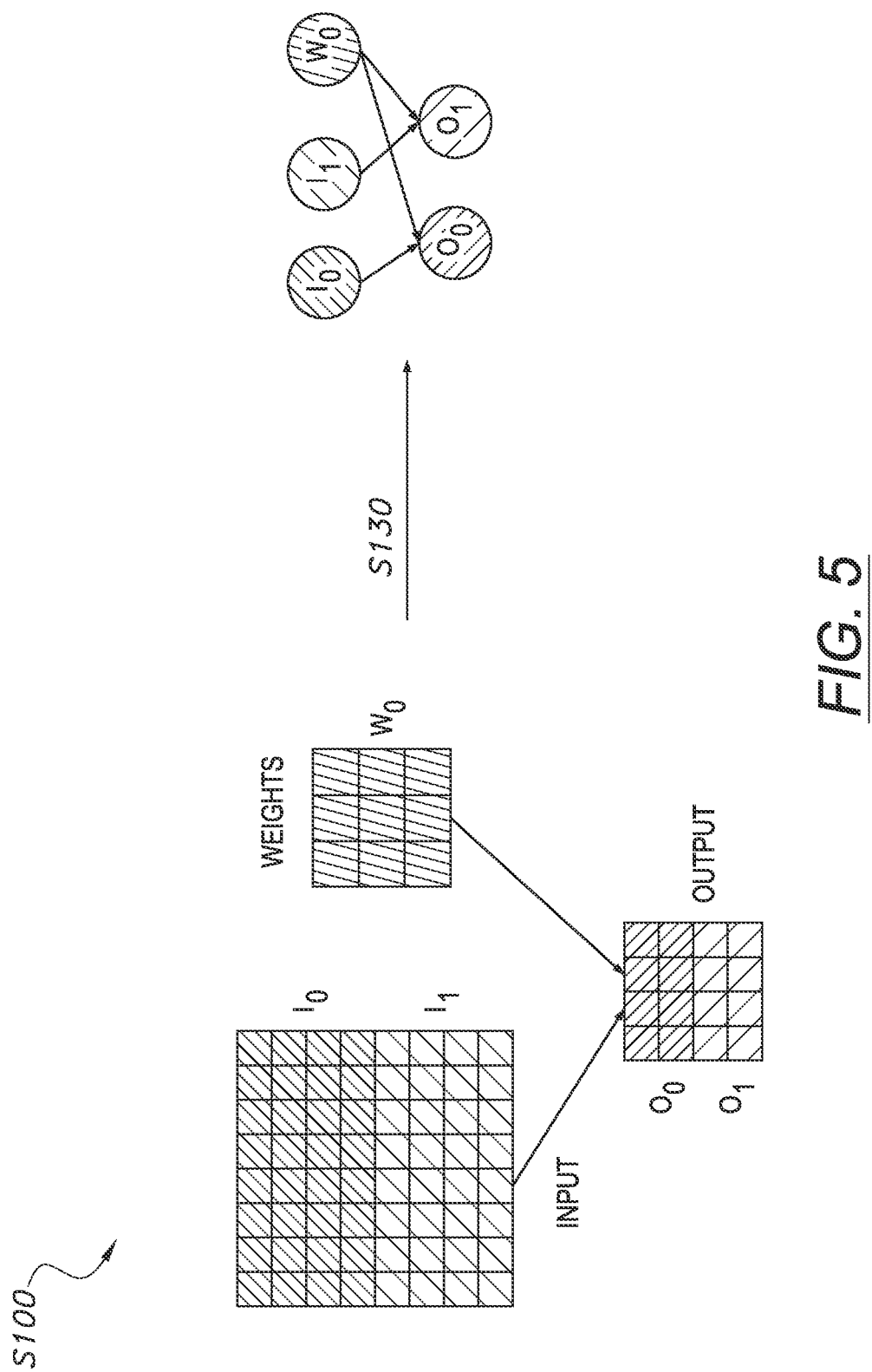
FIG. 5 is a flowchart representation of one variation of the method.

Generally, for each layer of the network, the system can, partition the input tensor and weight tensor of the layer based on the input tensor dimensions and the weight tensor dimensions and the properties of the processor, as shown in FIG. 5. More specifically, the system can, for each layer in the set of layers: partition the input tensor dimensions into a set of input tensor partitions based on the set of processor characteristics, the set of direct memory access characteristics, and the cost model; and partition the weight tensor dimensions into a set of weight tensor partitions based on the set of processor characteristics, the set of direct memory access characteristics, and the cost model. The system can then generate the graph representing execution of the layer by the multicore processor based on the set of processor characteristics, the set of direct memory access characteristics, the cost model, the set of input tensor partitions, and the set of weight tensor partitions.

In one implementation, the system can group several partitions in parallel (e.g., depending on the size of the transfer bus) when transferring the partitions in the memory hierarchy of the processor. Therefore, the system can primarily partition input tensors based on the size of the registers in the processor specific to the instructions inherent to a particular layer.

5.2.1 Input Tensor Partitioning

Generally, the system partitions the input tensor into chunks that can be efficiently operated on by the processor. More specifically, the system can divide the 1D, 2D, 3D, or 4D array into chunks that can fit within the registers defined by the processor. For example, the system can partition an input tensor representing a 30×30 pixel image with a color depth of 3 into 60 3×5×3 partitions for a processor including 64-bit 2D registers. Therefore, each partition can fit into the register in its entirety. In an alternative example, when the processor contains a 128-bit 2D register, the system can instead partition the 30×30 pixel image with a color depth of 3 into 30 6×5×3 partitions since each of these partitions can fit in its entirety into the 128-bit register.

In one implementation, the system can calculate the size of the partition based on a limiting dimension in the 2D register. For example, when the processor includes a 2D register that is 4×16 bits, the system can generate partitions that are less than 4 bits in one dimension, while less than 16 bits in another dimension.

In another implementation, the system can generate partitions of heterogeneous dimensions in order to maximize the usage of each register while a partition is loaded within the register. Therefore, for the previously described example in which the processor includes a 64-bit register, the system can partition the 30×30×3 input tensor into 42 4×5×3 partitions and 6 2×5×3 partitions, thereby reducing the number of unutilized bits in the register (for the whole layer) from 1140 to 372. Additionally or alternatively, the system can partition the input tensor to match the dimensions of the register whenever possible and batch the remaining bits of the layer in order to maximally occupy the register during processing of the remaining partitions (assuming the register size does not divide evenly into the input tensor).

However, the system can, for convolutional layers, generate overlapping partitions to enable a convolutional operation across all values of an input tensor. For example, given the 30×30×3 input tensor described above, a 3×3 receptive field (with zero padding and a stride of one), and a 64-bit register, the system can generate 126 overlapping 4×5×3 partitions and 14 4×3×3 partitions.

In one implementation, the system can execute packing algorithms to efficiently generate input partitions based on the dimensions of the input tensor, the register dimensions and/or the receptive field dimensions (for convolutional layers).

In one implementation, the system can generate input partitions for a subsequent layer based on outputs derived from each combination of the input partitions of the current layer and the weight partitions of the current layer. Additionally or alternatively, the system can generate input partitions for each layer independent of the partitions of prior layers by reassembling the output of the prior layer from the result of each partitioned layer and each partitioned weight before repartitioning the output according to the properties of the subsequent layer.

5.2.2 Weight Partitioning

Generally, the system generates a set of weight partitions dividing the set of weights for a layer into chunks that can be efficiently processed by the processor. More specifically, the system can partition a weight tensor of the layer based on the weight dimensions of the layer and the register dimensions of the processor to generate a set of weight partitions. In one implementation, the system can access processor properties indicating separate register files for weight tensors in the processor. Additionally or alternatively, the processor can also include register-to-ALU interconnects optimized for particular weight dimensions specific to common receptive field dimensions for convolutional neural networks such as 3×3 (2D), 4×4 (2D), 1×3 (1D Vertical), 1×4 (1D Vertical), 3×1 (1D Horizontal) and 4×1 (1D Horizontal). Therefore, the system can partition the weight tensor of a layer into multiple partitions, each partition corresponding to a supported dimension in the register-to-ALU interconnects of the processor. For example, for a layer specifying a 5×5 receptive field, the system can partition the 5×5 set of weights for the layer into a 4×4 partition, a 1×4 partition, a 4×1 partition, and a 1×1 partition. Thus, the system can divide a set of weights into blocks that can be efficiently executed by the processor.

The system can also partition weight tensors for fully connected or pooling layers according to the same principles.

5.3 Compute Operations

Generally, the system defines a set of operations for each layer of the network based on the type of layer, the input partitions and weight partitions of the layer, and the cost model for the processor. More specifically, the system can generate graphs defining a set of compute nodes representing a set of compute operations for the set of processor cores, the set of compute operations including: a convolution operation; a pooling operation; and a matrix arithmetic operation.

Other compute operations can include: executing a 1D convolution step on an input partition and a weight partition stored in the register file; executing a 2D convolution step on an input partition and a weight partition stored in the register file; loading bits into a shift register to obtain a shifted section of an input partition; performing matrix operations on 1D or 2D data stored in the register files; or any other instructions executable by a processor. In examples in which the processor includes multiple heterogenous cores with variable capabilities, the system can define operations corresponding to each core in the instructions set of each core such that the fixed schedule resulting from these instructions is executable by all cores of the processor.

The system can define operations for the processor at one or multiple levels of abstraction based on the specificity of the chip hardware for the task of evaluating a network. For example, the system can specify operations at a higher level of abstraction for a processor designed for performing matrix operations and/or executing convolutional neural networks, which includes these more complex operations within its basic instruction set. However, the system can specify operations at a lower level of abstraction for a GPU or processor that is not specialized to the task of executing artificial neural networks.

5.4 Data-Transfer Operations

Generally, the system defines a set of operations for each layer of the network based on the type of layer, the input partitions and weight partitions of the layer, and the cost model for the processor. More specifically, the system can generate graphs defining a set of data-transfer nodes representing a set of data-transfer operations for the set of DMA cores, the set of data-transfer operations including: a data transfer from a main memory of the multicore processor to a shared cache of the multicore processor; and a data transfer from the shared cache of the multicore processor to an individual cache in the set of individual caches of the multicore processor; a data transfer from an individual cache in the set of individual caches of the multicore processor to the shared cache of the multicore processor; and a data transfer from the shared cache of the multicore processor to the main memory of the multicore processor. Thus, the system can generate a schedule that specifies specific data-transfer operations to be executed by the DMA cores in the multicore processor.

In one implementation, the system can generate a graph that defines a broadcast data transfer as a data-transfer node for DMA cores that support broadcast operations, as described in U.S. Provisional Application No. 63/071,874. More specifically, the set of data-transfer operations can include a broadcast data transfer from the shared cache to a subset of individual caches in the set of individual caches of the multicore processor. Thus, the system can represent broadcast operations that transfer data from a single source address to multiple destination addresses, such as from a single source address in a shared cache to multiple destination addresses in distinct primary caches.

5.5 Problem Space Reduction and Candidate Graph Generation

Figure 8:
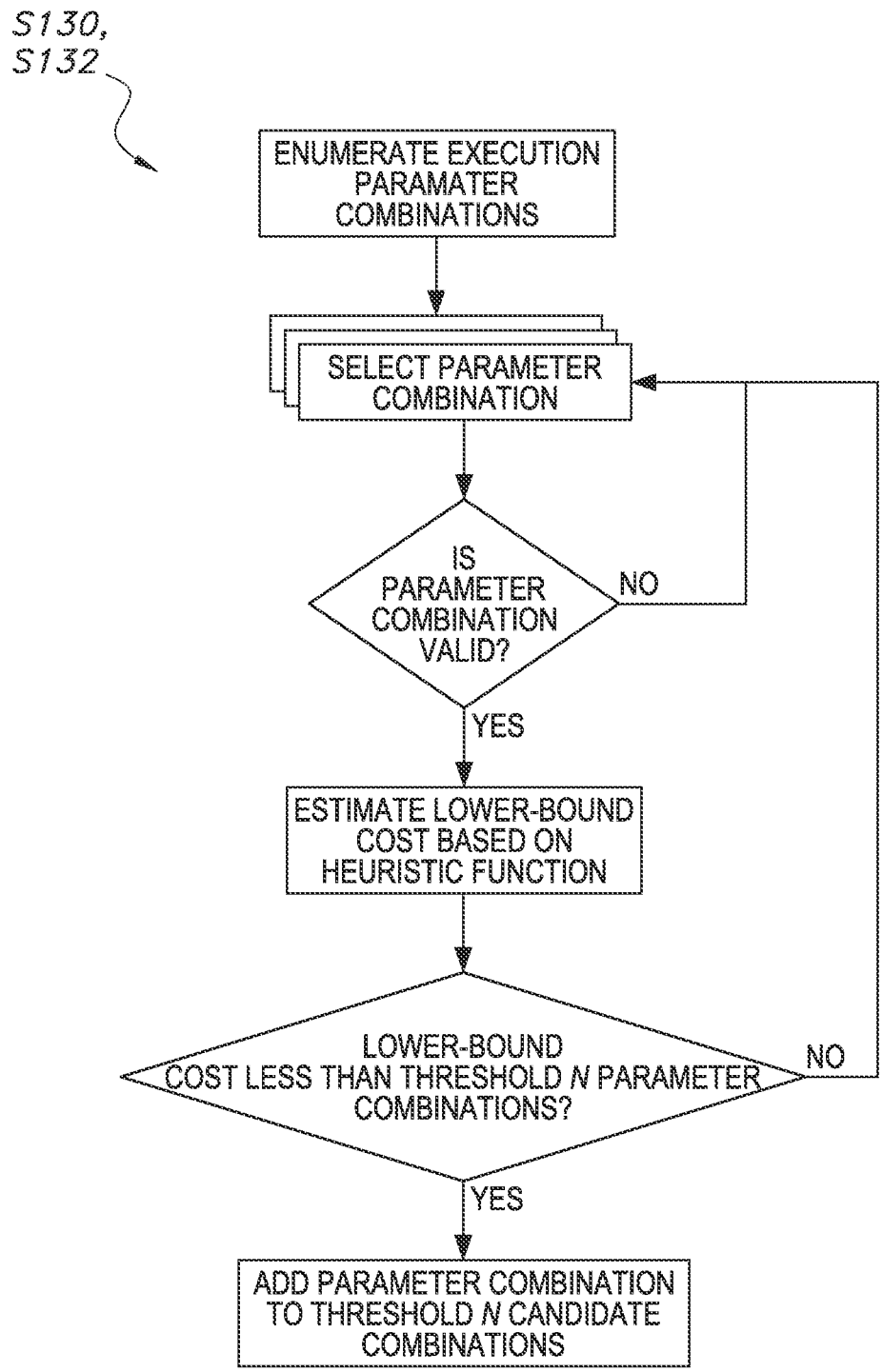
FIG. 8 is a flowchart representation of one variation of the method.

Generally, as shown in FIG. 8, the system can narrow the search space of potential graphs by evaluating a set of execution parameters (via a heuristic function) prior to generating a graph based on these parameters, which is a computationally expensive process. Therefore, the system can enumerate a large number of execution parameter combinations and only generate graphs for a threshold number of promising combinations based on the heuristic function. More specifically, the system can: for each execution parameter combination in an execution parameter set, calculate a lower-bound cost for the execution parameter combination based on the set of processor characteristics, the set of direct memory access characteristics, the cost model, and a heuristic function; select a set of candidate execution parameter combinations as a threshold number of lowest-cost execution parameter combinations; and, for each candidate execution parameter combination in the set of candidate execution parameter combinations, generate a candidate graph in the set of candidate graphs according to the candidate execution parameter combination. Thus, the system can test multiple partitioning and scheduling strategies (via the heuristic function) and can select the most efficient strategies for graphing and scheduling. The system can subsequently select a lowest-cost schedule from the set of candidate schedules as the selected schedule for a layer.

Generally, execution parameters for a particular layer can include: X, Y, and Zinput partition dimensions; X, Y, and Zweight partition dimensions; a number of active processor cores (out of a total number of processor cores); a number of active DMA cores (out of a total number of DMA cores); an operation priority rank; a node priority strategy (from a set of node priority strategies); and a resource utilization strategy (from a set of resource allocation strategies).

More specifically, the X, Y, and Zinput partition dimensions refer to the bit length of the input partition for each dimension of the input tensor. Generally, the system assumes regular partitions (as opposed to partitions of variable dimensions within the same layer). Likewise, the X, Y, and Z weight partition dimensions refer to the bit length of the weight partition for each dimension of the weight tensor. The number of active cores indicates the number of processor cores that are not in a sleep state during execution of the layer.

Due to the passive power consumption of active processor cores, the system can, for some applications, increase the efficiency of the static schedule by deactivating a subset of processor cores (e.g., if the layer cannot be sufficiently parallelized to utilize all available cores of the multicore processor). Likewise, the system can also deactivate a subset of DMA cores to reduce the passive power consumption of these DMA cores for applications in which data transfer operations cannot be sufficiently parallelized to utilize all available DMA cores.

The operation priority rank parameter indicates the relative priority of various types of operations for the scheduling algorithm. Thus, this execution parameter dictates the order with which operations are scheduled relative to each other. For example, the operation priority rank can specify that data-transfer operations from a primary cache to a shared cache are higher priority (and therefore are scheduled earlier) than all compute operations. Alternatively, the system can define an execution parameter that specifies pairwise priority between types of operations instead of a ranked list.

The node priority strategy parameter indicates the priority assignment strategy for operations of the same type. For example, this execution parameter can indicate that nodes with the highest out-degree are assigned highest priority, that nodes with the lowest out-degree are assigned highest priority, that nodes with the shortest approximate duration are assigned highest priority, that nodes with the longest approximate duration are assigned highest priority, that nodes with the lowest depth are assigned highest priority, or that nodes with highest depth are assigned highest priority.

The resource utilization strategy parameter indicates a priority assigned to particular resources of the multicore processor that determines the order with which operations are scheduled at these resources via the DAG scheduling algorithm. For example, the set of resource utilization strategies can indicate that least-recently used processor cores are given higher priority, or that most-recently used processor cores are given highest priority.

By enumerating a large number of combinations of the set of execution parameters and testing each one via the heuristic function, the system can assess an approximate lower-bound cost of each combination and choose only the lowest-cost candidates for further evaluation. More specifically, the system can, for each combination of execution parameters, evaluate a heuristic function according to the set of processor characteristics, the set of direct memory access characteristics, and the cost model, the heuristic function approximating a directed acyclic graph scheduling algorithm executed according to the combination of execution parameters.

Once the system has aggregated a threshold number of candidate parameter combinations, the system can generate a candidate graph based on each of the candidate parameter combinations. More specifically, the system can generate a set of candidate graphs representing execution of the layer by the multicore processor based on the set of processor characteristics, the set of direct memory access characteristics, and the cost model, in Block S132, each candidate graph in the set of candidate graphs defining a set of compute nodes representing a set of compute operations, a set of data transfer nodes representing a set of data transfer operations, and a set of edges representing dependencies between the set of compute operations and the set of data transfer operations. For example, the system can aggregate twenty lowest-cost candidate parameter sets (based on the heuristic function) and calculate twenty candidate graphs based on these parameter sets. Thus, in this example, the system narrows the search space that includes tens of thousands of possibilities to only twenty candidate graphs.

6. Scheduling

Figure 6:
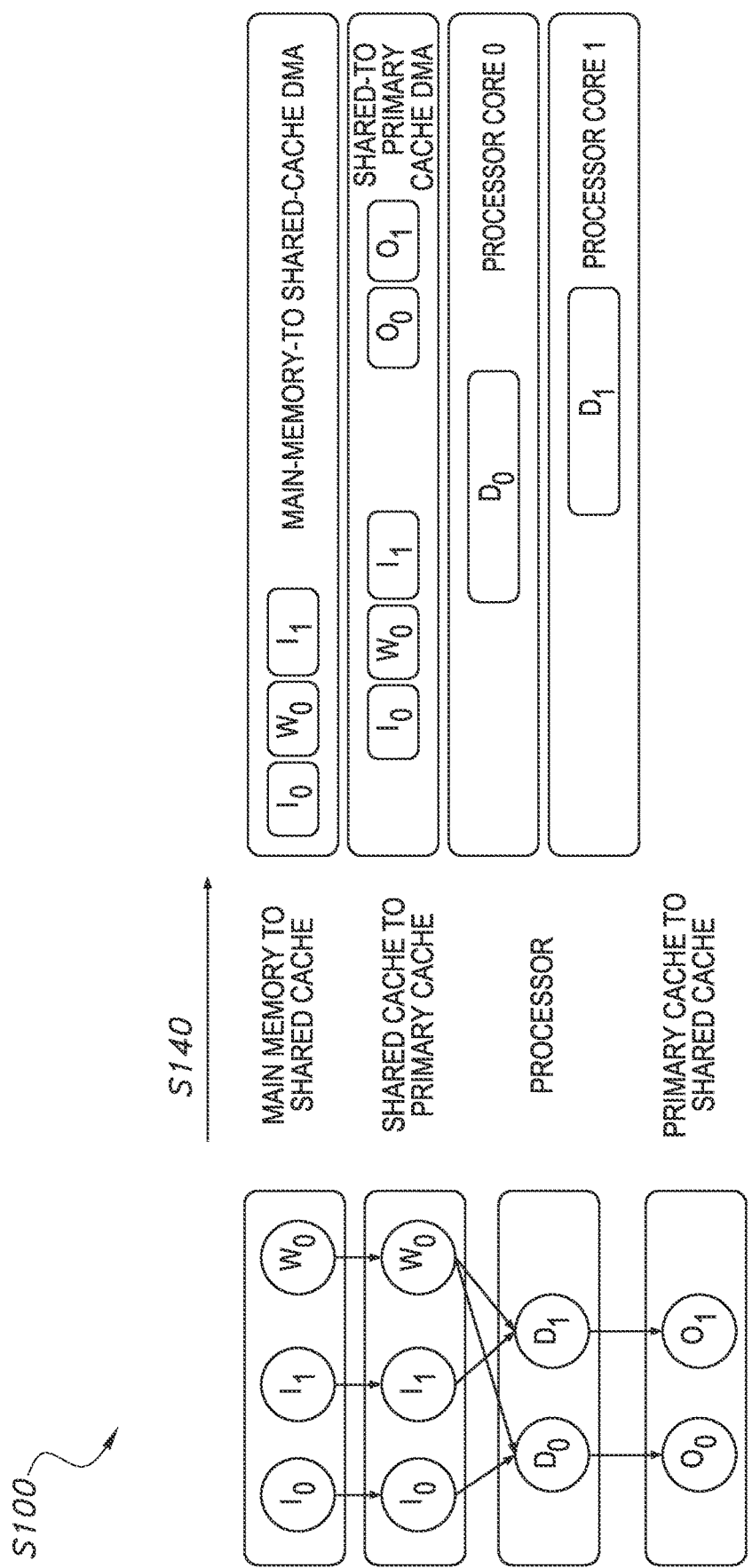
FIG. 6 is a flowchart representation of one variation of the method.

Generally, upon generating a graph representing execution of a layer of the network on the multicore processor, the system can convert this graph into a schedule assigning (or allocating) each of the operations represented by nodes of the graph to individual compute resources and data-transfer resources of the network via a DAG scheduling algorithm, as shown in FIG. 6. More specifically, the system can, for each layer in the set of layers, generate a schedule for the layer based on the graph for the layer, the schedule assigning the set of compute nodes to the set of processor cores and assigning the set of data transfer nodes to the set of direct memory access cores in Block S140. Thus, the schedule of each layer defines a queue of instructions for each active compute resource and for each active data-transfer resource of the multicore processor that, when executed by the multicore processor, executes one layer of the network.

Figure 9:
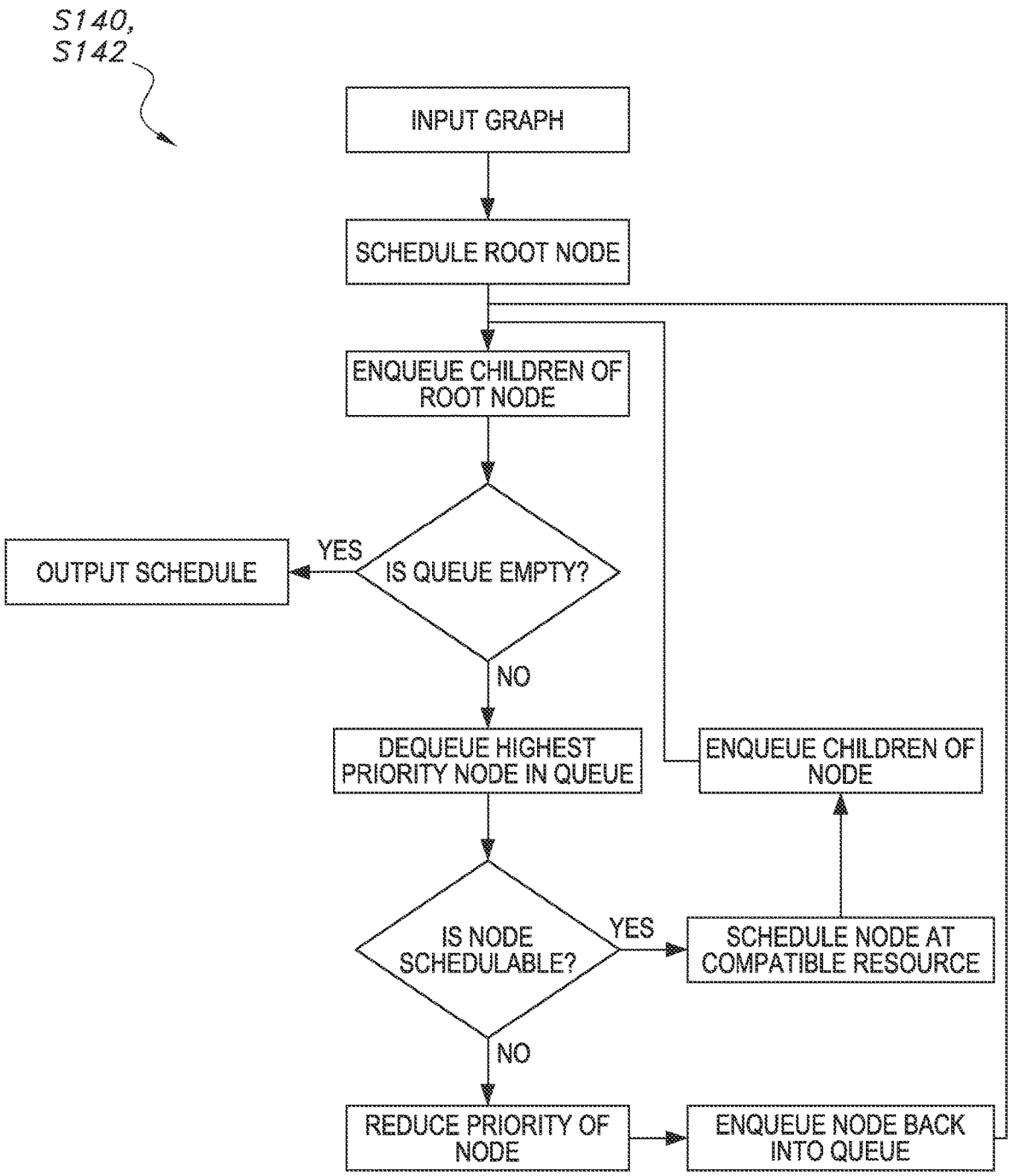
FIG. 9 is a flowchart representation of one variation of the method.

In one implementation, shown in FIG. 9, the system can execute a priority-based greedy scheduler in order to generate the schedule based on the graph. The system can assign operations to resources according to a priority strategy associated with a graph. More specifically, the system can calculate a node priority for each compute node in the set of compute nodes and for each data transfer node in the set of data transfer nodes of the graph. Additionally, the system can assign a priority to each node in the graph based on the type of operation represented by the node and the number of child nodes that depend on the node (i.e., the outdegree of the node) according to a priority scheme defined by the execution parameters associated with the graph. For example, the system can assign higher priorities to nodes representing computational operations while assigning lower priorities to nodes representing transfers between registers or busses in order to prioritize operations with longer durations. In another example, the system can prioritize operations based on the depth of these operations in the graph. In yet another example, the system can calculate the node priority for each compute node in the set of compute nodes and for each data transfer node in the set of data transfer nodes based on an out-degree of each compute node in the set of compute nodes and of each data transfer node in the set of data transfer nodes.

Once the system has assigned a priority to each node in the graph, the system can schedule the root node of the graph and can insert all the children of the root node into a priority queue ordered by the assigned priority of each child node.

Upon adding the child nodes to the queue, the system dequeues a highest priority node in a queue of nodes for scheduling on a compatible resource. For example, for a dequeued node representing a compute operation, the system can attempt to schedule the represented compute operation at a compute resource. In another example, for a dequeued node representing a data-transfer operation between a shared cache and primary cache, the system can attempt to schedule the data-transfer operation at a shared-to-primary cache DMA core in the multicore processor. Thus, the system can schedule each operation at any available resource compatible with the operation represented by the node.

The system can schedule the operation represented by the dequeued node at an available resource by adding this operation to a queue corresponding to the available resource and indicating an approximate duration of the operation (e.g., based on the cost model). The system can then add children of the highest priority node to the queue. The system can then dequeue a subsequent node from the priority queue. When the system is not able to schedule the node (e.g., no resources are available), the system can reduce the priority of this node and reinsert the node into the queue in order to allow the resources that can operate on this node to free up from performing previously scheduled nodes.

In one implementation, the system can also assign a priority to particular resources based on a resource utilization strategy. Therefore, if multiple resources are available that are compatible with an operation, the system can schedule the operation at a resource with a highest priority according to the resource utilization strategy associated with the graph.

The system can rank and schedule operations according to multiple DAG scheduling algorithms such as heterogeneous earliest finish time algorithm (HEFT), monte carlo algorithms (MCA), critical path on a processor algorithm (CPOPA), synthesized heuristic task scheduling algorithm (HCPPEFT), longest dynamic critical path algorithm (LDCP), highest level first with estimated time (HLFET), or any other static scheduling algorithm. The system can then select the most efficient schedule from a set of combinations of partitioning algorithms and scheduling algorithms in order to improve the efficiency of the schedule. The system can therefore assign operations in the DAG to parallel processing resources in the processor such that these operations can be executed in parallel. More specifically, the system can: for each processor core in the set of processor cores, generate a queue of compute operations from the set of compute operations based on the set of compute nodes and the set of edges; and, for each direct memory access core in the set of direct memory access cores, generate a queue of data transfer operations comprising a subset of the set of data transfer operations based on the set of data transfer nodes and the set of edges. In particular, the system can generate queues for each compute resource and data-transfer resource of the multicore processor that defines an estimated start time and an estimated end time for each operation in the queue, thereby maintaining dependencies between these operations as specified by the graph.

6.1 Signal and Wait Insertion

Figure 7:
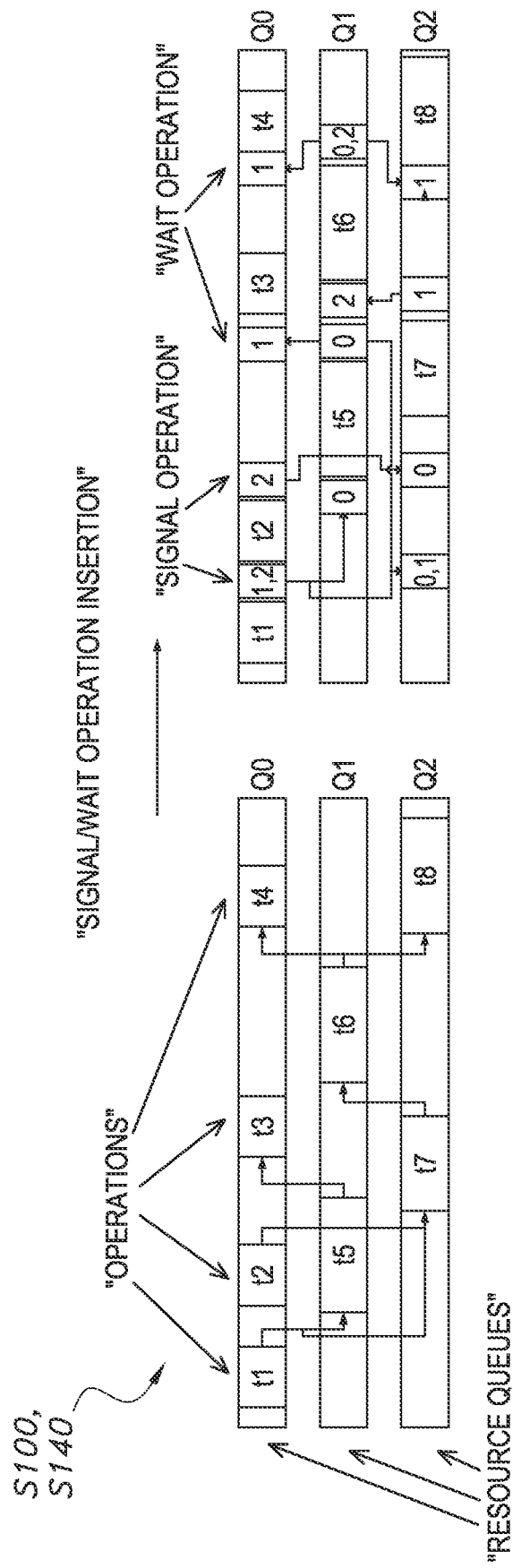
FIG. 7 is a flowchart representation of one variation of the method.

In one implementation, as shown in FIG. 7, the system can insert signal and wait operations into a schedule in order to prevent the multicore processor from deadlocking due to deviations between the estimated execution time of the set of compute operations and the set of data-transfer operations and the actual duration of these operations when executed on the multicore processor. More specifically, the system can insert signal operations and wait operations into the queue of compute operations for each processor core in the set of processor cores and into the queue of data transfer operations for each direct memory access core in the set of direct memory access cores. Thus, the multicore processor can efficiently track signal and wait operations within the static schedule via the signal-wait counter matrix of the queue processor described in U.S. Provisional Application No. 62/994,108 in order to prevent deadlocks in the static schedule.

For each signal operation, the system can define the computational resource that is waiting for the signal. For example, for a dependency between an operation performed by the DMA core between share cache and a primary cache of a processor core and an operation performed by a processor core, the system can define a signal operation subsequent to the transfer of data from the shared cache to the primary cache, wherein the signal operation corresponds to the processor core. For each wait operation, the system can define a particular computational resource or event, which ends the wait operation and enables the computational resource to perform the subsequent queue operation.

In one implementation, the system can define signal/wait operations between only a subset of dependent operations from the DAG, thereby decreasing the processing delay caused by each signal/wait dependency. For example, the system can transfer multiple input partitions into primary memory and execute a single signal/wait operation after the last input partition has been loaded into primary memory that initiates multiple convolution operations on the input partitions. Thus, the system can opportunistically remove barriers to improve performance without sacrificing accuracy.

In another implementation, the system inserts signal operations and wait operations based on the existing queue of operations for each resource in the multicore processor and the estimated start and end times of each of these operations. Thus, the system can insert signal and wait operations at locations within the schedule without referencing dependencies defined by the graph from which the schedule was generated. In this implementation, the system relies on the DAG scheduling algorithm to maintain dependencies between operations executed on separate resources based on the timing and order of these operations and inserts signal and wait operations within the static schedule where timing deviation is likely to cause a deadlock.

Thus, upon signal and wait insertion, the system can develop a queue for each computational resource of the processor such that the processor can execute operations according to this queue while preventing deadlocks (e.g., executing an operation without the necessary data, performing an operation when there is no available memory for an output of the operation). These queues together form a static schedule for each layer of the network.

6.2 Candidate Schedule Generation

In one variation in which the system generates multiple candidate graphs for each layer in Block S132, the system can subsequently generate a candidate schedule based on each candidate graph in the set of candidate graphs to generate a set of candidate schedules in Block S142. More specifically, the system can generate a set of candidate schedules for the layer based on the set of candidate graphs, each candidate schedule in the set of candidate schedules assigning the set of compute nodes to the set of processor cores and assigning the set of data transfer nodes to the set of direct memory access cores in Block S142. Additionally, as described above with respect to generating an individual schedule for a layer of the network, the system can also, for each candidate graph in the set of candidate graphs: calculate a node priority for each compute node in the set of compute nodes and for each data transfer node in the set of data transfer nodes; and execute a directed acyclic graph scheduling algorithm based on the node priority for each compute node in the set of compute nodes and for each data transfer node in the set of data transfer nodes to generate a candidate schedule in the set of candidate schedules. Thus, the system can transform the set of promising candidate graphs for a layer into a set of promising candidate schedules before selecting a selected schedule for the layer.

6.2.1 Schedule Selection

In this variation, the system can generate a set of candidate schedules for each layer of the network and select a selected schedule that is characterized by the most desirable properties for the application of the network. More specifically, the system can select a selected schedule for the layer from the set of candidate schedules for the layer based on an objective function in Block S144. Thus, the system can increase the likelihood of selecting a schedule that satisfies the design criteria of the user by generating a set of candidate schedules likely to exhibit desirable characteristics.

In order to evaluate each candidate schedule according to the design criteria of the user, the system can simulate each candidate schedule in the set of candidate schedules based on the cost model for the processor to estimate various performance metrics of each candidate schedule. More specifically, the system can simulate each candidate schedule to generate expected inferences-per-second of the candidate schedule, expected energy consumption of the candidate schedule, expected peak power consumption of the candidate schedule, and/or the expected peak memory footprint of the schedule, as executed on the multicore processor; and select a selected schedule for the layer from the set of candidate schedules for the layer based on an objective function. Alternatively, in one implementation further described below, the system can render this information for viewing by a user of the system to enable the user to evaluate whether the simulated properties of the schedule align with the user's design criteria.

Upon estimating the performance metrics of each candidate schedule, the system can evaluate each candidate schedule according to the design criteria of the user by executing an objective function on each candidate schedule. The objective function takes as input the performance metrics of each candidate schedule in the set of candidate schedules and outputs a selected schedule from the set of candidate schedules. The system can execute objective functions that weigh performance metrics of each schedule such as IPS, energy consumption, peak power consumption, and/or peak memory footprint to output a score for each schedule. The system can then select the schedule for the layer with the "best" score (e.g., highest score or lowest score). For example, the system can evaluate an objective function that scores each candidate schedule based on a weighted average of the expected IPS of the candidate schedule and the expected energy consumption of the candidate schedule. In another example, the system can evaluate an objective function that scores each candidate schedule based only on the expected IPS of the candidate schedule. Thus, the system can select a selected schedule from the set of candidate schedules based on an objective function of any of the aforementioned performance metrics.

In one implementation, the system can render a set of option icons corresponding to a set of objective functions at a user interface, thereby enabling the user to select an objective function with which the system can evaluate the set of candidate schedules for each layer of the network. More specifically, the system can: at a user interface, receive an input selecting an objective function from a set of objective functions; and select the selected schedule for the layer from the set of candidate schedules for the layer based on the objective function. Thus, the system can receive a direct input from the user specifying an objective function that represents the user's design criteria for the user's particular application of the network and multicore processor.

6.3 Complete Schedule Aggregation

Generally, upon generating a schedule for each layer in the network, the system can aggregate these per-layer schedules into a complete schedule for the network. More specifically, the system can aggregate the selected schedule for each layer in the set of layers to generate a complete schedule for execution of the artificial neural network on the multicore processor in Block S15o. Because the system generates a schedule for each layer independent of other layers in the network, the system can combine these per-layer schedules into a complete schedule by simply concatenating these schedules.

In one implementation, the system can modify the per-layer schedules during the aggregation step in order to coordinate the final memory location of the output tensor of a first layer with the initial memory location of the input tensor of the subsequent layer. Thus, the system can retroactively modify the set of per-layer schedules in order to improve transitions between layer executions by the multicore processor.

7. User Interface:

In one variation, the system can render a user interface at a user device in order to enable the user to provide inputs to system during execution of the method S100. More specifically, the system can: render a representation of the set of complete schedules in Block S16o; and receive a selection of a selected complete schedule in Block S170. In this variation, instead of automatically selecting a selected schedule for each layer based on a single objective function, the system can generate multiple complete schedules based on a set of objective functions. For example, the system can generate a complete schedule based on an IPS-based objective function, an energy-consumption-based objective function, or a hybrid objective function weighing both of these performance metrics. The system can then render cumulative performance metrics of each complete schedule resulting from the execution of each of these objective functions and enable the user to select a complete schedule from this set of complete schedules. Thus, the system can enable increased customization of static schedules generated for the multicore processor.

In one implementation of this variation, the system can, for each layer of the network, display a representation of the performance metrics of each complete schedule and receive an input from the user selecting a selected schedule for the layer from the set of candidate schedules instead of autonomously selecting a selected schedule for the layer based on the aforementioned objective function. More specifically, the system can: simulate the set of complete schedules based on the processor representation to calculate an inference time and a power consumption of each complete schedule in the set of complete schedules; at the user interface, render the inference time and power consumption of each schedule in the set of complete schedules to generate a plot of inference time versus power consumption for the set of complete schedules; and receive an input at the plot of interference time versus power consumption selecting a selected complete schedule. Thus, the system can graphically represent a number of options of complete schedules and enable the user to choose a selected complete schedule from among these options that satisfies the user's design criteria for the network.

In another implementation, the system can render a set of option icons representing a set of cost models that inform the initial graph generation process. The system can then receive input from the user at the user interface indicating a cost model with which to generate the set of candidate graphs (in Block S132). More specifically, the system can receive an input designating the cost model from a set of cost models including, for example: a shortest-inference-time cost model; a lowest-power-consumption cost model; and a hybrid-weighted cost model. Thus, the system can enable the user, via a user interface, to influence the method S100 at multiple points in order to better tailor the resulting static schedule to the design criteria of the user.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for scheduling an artificial neural network on a multicore processor comprising:
   accessing a processor representation of the multicore processor, the processor representation comprising:
   a set of processor cores characterized by a set of processor characteristics;
   a set of direct memory access cores characterized by a set of direct memory access characteristics; and
   a cost model;
   accessing a network structure defining a set of layers of the artificial neural network;
   for each layer in the set of layers:
   generating a set of candidate graphs representing execution of the layer by the multicore processor based on the set of processor characteristics, the set of direct memory access characteristics, and the cost model, each candidate graph in the set of candidate graphs defining:
   a set of compute nodes representing a set of compute operations for the set of processor cores;
   a set of data transfer nodes representing a set of data transfer operations for the set of direct memory access cores; and
   a set of edges representing dependencies between the set of compute operations and the set of data transfer operations; and
   generating a set of candidate schedules for the layer based on the set of candidate graphs, each candidate schedule in the set of candidate schedules assigning the set of compute nodes to the set of processor cores and assigning the set of data transfer nodes to the set of direct memory access cores;
   generating a set of complete schedules based on the set of candidate schedules for each layer in the set of layers;
   simulating the set of complete schedules based on the processor representation to calculate an inference time and a power consumption of each complete schedule in the set of complete schedules;
   at a user interface:
   rendering the inference time and power consumption of each schedule in the set of complete schedules to generate a plot of inference time versus power consumption for the set of complete schedules; and
   receiving an input at the plot of interference time versus power consumption selecting a selected complete schedule; and
   loading the selected complete schedule onto the multicore processor.

2. The method of claim 1, further comprising, at the multicore processor, executing the complete schedule.

3. The method of claim 1, wherein accessing the processor representation of the multicore processor comprises accessing the processor representation comprising:
   the set of processor cores characterized by the set of processor characteristics comprising:
   register types of each processor core in the set of processor cores;
   register dimensions of each processor core in the set of processor cores; and
   core type of each processor core in the set of processor cores; and
   the set of direct memory access cores characterized by the set of direct memory access characteristics.

4. The method of claim 1, wherein accessing the processor representation of the multicore processor comprises accessing the processor representation comprising:

the set of processor cores characterized by the set of processor characteristics; and the set of direct memory access cores characterized by the set of direct memory access characteristics comprising:
a memory configuration of each direct memory access core in the set of direct memory access cores;
a bus size of each direct memory access core in the set of direct memory access cores; and
a broadcast functionality of each direct memory access core in the set of direct memory access cores.

5. The method of claim 1, wherein accessing the processor representation of the multicore processor comprises accessing the processor representation of the multicore processor comprising:
the set of processor cores characterized by the set of processor characteristics;
the set of direct memory access cores characterized by the set of direct memory access characteristics; and
the cost model indicating a number of cycles and a power consumption of each operation in the set compute operations and each operation in the set of data transfer operations.

6. The method of claim 1:
wherein accessing the network structure comprises accessing the network structure defining the set of layers of the artificial neural network, each layer in the set of layers characterized by:
a layer type from a set of layer types comprising:
a convolutional layer type;
a pooling layer type; and
a fully connected layer type;
a set of input tensor dimensions; and
a set of weight tensor dimensions; and
wherein, for each layer in the set of layers, generating the set of candidate graphs representing execution of the layer by the multicore processor comprises generating the set of candidate graphs representing execution of the layer by the multicore processor based on the set of processor characteristics, the set of direct memory access characteristics, the cost model, the layer type of the layer, the set of input tensor dimensions of the layer, and the set of weight tensor dimensions of the layer.

7. The method of claim 1:
further comprising, for each layer in the set of layers:
partitioning input tensor dimensions of the layer into a set of input tensor partitions based on the set of processor characteristics, the set of direct memory access characteristics, and the cost model; and
partitioning weight tensor dimensions of the layer into a set of weight tensor partitions based on the set of processor characteristics, the set of direct memory access characteristics, and the cost model; and
wherein generating the selected set of candidate graphs representing execution of the layer by the multicore processor comprises generating the selected set of candidate graphs representing execution of the layer by the multicore processor based on the set of processor characteristics, the set of direct memory access characteristics, the cost model, the set of input tensor partitions, and the set of weight tensor partitions.

8. The method of claim 1, wherein generating the set of candidate graphs representing execution of the layer by the multicore processor comprises generating the selected set of candidate graphs representing execution of the layer by the multicore processor based on the set of processor characteristics, the set of direct memory access characteristics, and the cost model, each candidate graph in the set of candidate graphs defining:
the set of compute nodes representing the set of compute operations for the set of processor cores, the set of compute operations comprising:
a convolution operation;
a pooling operation; and
a matrix arithmetic operation;
the set of data transfer nodes representing the set of data transfer operations for the set of direct memory access cores; and
the set of edges representing dependencies between the set of compute operations and the set of data transfer operations.

9. The method of claim 1, wherein generating the set of candidate graphs representing execution of the layer by the multicore processor comprises generating the set of candidate graphs representing execution of the layer by the multicore processor based on the set of processor characteristics, the set of direct memory access characteristics, and the cost model, each candidate graph in the set of candidate graphs defining:
the set of compute nodes representing the set of compute operations for the set of processor cores;
the set of data transfer nodes representing the set of data transfer operations for the set of direct memory access cores, the set of data transfer operations comprising:
a data transfer from a main memory of the multicore processor to a shared cache of the multicore processor;
a data transfer from the shared cache of the multicore processor to an individual cache in the set of individual caches of the multicore processor;
a data transfer from an individual cache in the set of individual caches of the multicore processor to the shared cache of the multicore processor; and
a data transfer from the shared cache of the multicore processor to the main memory of the multicore processor; and
the set of edges representing dependencies between the set of compute operations and the set of data transfer operations.

10. The method of claim 9, wherein the set of data transfer operations comprises a broadcast data transfer from the shared cache to a subset of individual caches in the set of individual caches of the multicore processor.

11. The method of claim 1, wherein generating the set of candidate schedules for the layer based on the set of candidate graphs comprises:
for each processor core in the set of processor cores, generating a queue of compute operations from the set of compute operations based on the set of compute nodes and the set of edges;
for each direct memory access core in the set of direct memory access cores, generating a queue of data transfer operations comprising a subset of the set of data transfer operations based on the set of data transfer nodes and the set of edges; and
inserting signal operations and wait operations into the queue of compute operations for each processor core in the set of processor cores and into the queue of data transfer operations for each direct memory access core in the set of direct memory access cores.

12. The method of claim 1, wherein generating the set of candidate graphs comprises:
  for each execution parameter combination in an execution parameter set, calculating a lower-bound cost for the execution parameter combination based on the set of processor characteristics, the set of direct memory access characteristics, and the cost model;
  selecting a set of candidate execution parameter combinations as a threshold number of lowest-cost execution parameter combinations; and
  for each candidate execution parameter combination in the set of candidate execution parameter combinations, generating a candidate graph in the set of candidate graphs according to the candidate execution parameter combination.

13. The method of claim 12, wherein calculating the lower-bound cost for the execution parameter combination comprises evaluating a heuristic function according to the set of processor characteristics, the set of direct memory access characteristics, and the cost model, the heuristic function approximating a directed acyclic graph scheduling algorithm.

14. The method of claim 1, wherein generating the set of candidate schedules for the layer based on the set of candidate graphs comprises, for each candidate graph in the set of candidate graphs:
  calculating a node priority for each compute node in the set of compute nodes and for each data transfer node in the set of data transfer nodes; and
  executing a directed acyclic graph scheduling algorithm based on the node priority for each compute node in the set of compute nodes and for each data transfer node in the set of data transfer nodes to generate a candidate schedule in the set of candidate schedules.

15. The method of claim 14, wherein calculating the node priority for each compute node in the set of compute nodes and for each data transfer node in the set of data transfer nodes comprises calculating the node priority for each compute node in the set of compute nodes and for each data transfer node in the set of data transfer nodes based on an out-degree of each compute node in the set of compute nodes and of each data transfer node in the set of data transfer nodes.

16. The method of claim 1, further comprising, at the user interface, receiving an input designating the cost model from a set of cost models comprising:
  a shortest-inference-time cost model;
  a lowest-power-consumption cost model; and
  a hybrid-weighted cost model.

* * * * *